3,511,590
PROCESS FOR DYEING OR PRINTING
FIBROUS MATERIALS
Raymond Gunst, Binningen, Rudolf Aenishaenslin, Reinach, Alfred Fasciati, Bottmingen, and Eugen Johann Koller, Oberwil, Switzerland, assignors to Ciba Limited, Basel, Switzerland, a company of Switzerland
No Drawing. Continuation-in-part of application Ser. No. 738,969, June 2, 1958. This application Aug. 8, 1961, Ser. No. 129,971
Claims priority, application Switzerland, June 20, 1957, 47,462
Int. Cl. D06p 5/00, 7/00
U.S. Cl. 8—18        13 Claims

ABSTRACT OF THE DISCLOSURE

A process for dyeing or printing cellulosic material by impregnating it with aqueous dyeing preparations containing a colourless, at least dispersible and hardenable aminoplast precondensate and a water-soluble dyestuff containing a triazine ring bearing at least one amino or substituted amino group participating in the resin formation when in a subsequent step the impregnated material is submitted to a heat treatment.

The dyeings and prints obtained show a good fastness to wetting and washing.

---

This application is a continuation-in-part application of our copending application Ser. No. 738,969, filed June 12, 1958, and now abandoned.

The present invention provides a process for dyeing or printing fibrous materials, wherein the fibrous material, after being impregnated with an aqueous preparation which contains a water-soluble dyestuff containing at least one amino group bound to a triazine ring or an $H_2N$—OC—NH-group or an alkylamino group bound to a triazine ring or an alkylolated $H_2N$—CO—NH-group, and which preparation also contains an at least dispersible, hardenable, colorless formaldehyde condensation product aminoplast, it treated to harden the aminoplast.

The process can be applied to a very wide variety of fibrous materials, such as leather, paper, glass fibers, and especially textile fibers. The textile fibers may be synthetically or semi-synthetically made fibers, such as fibers of acetyl-cellulose, polyamides, polyurethanes, polyacrylonitrile or polyesters. Especially good results are obtained by the process in dyeing or printing cellulose fibers, for example, those of natural cellulose, such as linen or cotton.

As stated above, it is not necessary that the dyestuff used in the process should possess an affinity for the fibers to be dyed, and in general especially good results can be produced with dyestuffs having little or no affinity for the fibers.

The dyestuffs must be soluble in water. There are used more especially dyestuffs which contain as groups imparting solubility in water at least one carboxylic acid group or advantageously at least one sulfonic acid group.

Apart from this, dyestuffs of any class may be used, for example, the class of nitro-dyestuffs, oxazines, sulfonated copper phthalocyanines, polymethines or azomethines, azoxy-dyestuffs, anthraquinones or azo-dyestuffs and azo-dyestuffs including more especially monoazo-dyestuffs.

The dyestuffs used in the process of this invention contain at least one of the above listed atomic groupings. As amino triazine groups there are advantageously used:

Alkyl-HN-aryl-HN-(preferably phenyl-HN-) of $H_2N$- groups bound to a 1:3:5-triazine ring (amides of cyanuric acid), for example, the grouping of the formula:

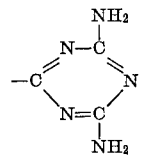

or of the formula

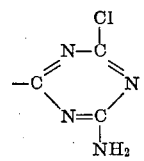

Another group of dyestuffs suitable for the present process are the copper phthalocyanines which contain sulfonic acid groups and at least one N-alkylol group or a group convertible into an N-alkylol group. They may contain, for instance, a secondary or primary amino group, such as a monoalkylamino group or preferably an $H_2N$-group. Particularly suitable are the copper phthalo-cyanines containing the above mentioned aminotriazine radicals and also those containing sulfonic acid amide groups.

Instead of using dyestuffs containing amino-groups, there may be used dyestuffs containing N-methylol groups. The latter groups can be formed by the reaction of dyestuffs containing $H_2N$-groups in known manner with formaldehyde or an agent yielding formaldehyde, whereby one or both hydrogen atoms of the $H_2N$-group is replaced by an $HO-CH_2$-group, or a mixture of monomethylolamino- and dimethylolamino - compounds is obtained. Furthermore, the dyestuffs may contain, instead of $H_2N$-groups or methylolamino groups, other alkanolamino groups of low molecular weight, especially mono- or di-ethanolamino groups.

In some cases especially good results are obtained with dyestuffs which contain more than one, for example, two alkanolamino groups or two groups convertible into alkanolamino groups.

Furthermore valuable results are also obtained with water soluble disazo dyestuffs of the formula

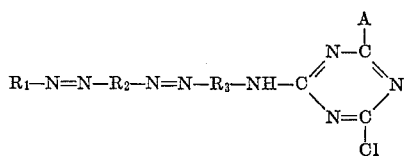

in which $R_1$, $R_2$ and $R_3$ each represent an aromatic radical containing at the most 10 ring carbon atoms and containing only aromatic rings and A represents an amino group. $R_1$, $R_2$ and $R_3$ are benzene or naphthalene radicals which may carry further substituents, such as methyl or methoxy groups, and primarily sulfonic acid groups to which the dyestuffs owe their solubility in water.

In addition to a water soluble dyestuff as defined above, the aqueous preparations with which the fibrous material is impregnated in the process of this invention contain an aminoplast which is at least dispersible in water. As such aminoplasts there are to be understood those which are dispersible in water either alone or with the aid of a dispersing agent or advantageously aminoplasts that are soluble in water. In the latter case the aminoplasts need not be of unlimited solubility in water, but aminoplasts may be used of which limited proportions dissolve in water to form aqueous solutions.

Subject to the above requirement, any aminoplasts may be used, for example, urethane resins, sulfonamide resins, dicyandiamide resins, aniline resins, and more especially urea resins or melamine resins.

Thus, for example, there may be used, urea-formaldehyde resins. These resins may be derived from methylolureas obtained from one molecular proportion of urea and 2–4 molecular proportions of formaldehyde, or they may be alkyl ethers of these methylol-compounds with alcohols of low molecular weight such as methanol or n-butanol, in which ethers only a part of the methylol groups need be etherified. As examples there may also be mentioned methyl ethers of methylol-ethylene-ureas and methyl-acetylene-ureas and methyl ethers thereof.

There may also be used condensation products of formaldehyde with compounds, such as dicyandiamide or melamine, which contain at least one atomic group of the formula:

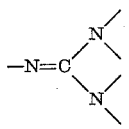

or compounds, such as cyanamide, easily convertible into compounds containing the said atomic grouping.

The formaldehyde condensation products used in the present process may be derived from a very wide variety of cyclic or non-cyclic compounds containing the aforesaid atomic grouping. Among non-cyclic compounds there may be mentioned, for example, dicyandiamide, dicyandiamidine, guanidine, acetoguanidine and biguanide. Suitable condensation products are, for example, those obtained by using more than one molecular proportion, for example, 2–4 molecular proportions or more of formaldehyde, for each molecular proportion of the compound containing at least once the atomic grouping:

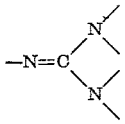

There may be used condensation products of this kind which have been obtained in a neutral, alkaline or acid medium.

The condensation products of formaldehyde and a cyclic compound containing the aforesaid atomic grouping are advantageously derived from aminotriazines. There may be used methylol-compounds of aminotriazines or ethers thereof.

Among these compounds there may be mentioned more especially reaction products of formaldehyde with 2:4:6-triamino-1:3:5-triazine, commonly known as melamine. Such condensation products may contain 1–6, preferably 3–6 methylol groups, and they are usually mixtures of different compounds. There may also be used methylol compounds of derivatives of melamine which contain at least one amino group, for example, methylol compounds of melam, melem, ammeline or ammelide, or halogen substituted ainotriazines, such as 2-chloro-4:6-diamino-1:3:5-triazine; and also methylol-compounds of guanamines, for example, of benzoguanamine, acetoguanamine or formoguanamine.

There may also be used in the process of this invention condensation products of formaldehyde with guanylmelamines. Such condensation products may be derived from mono-, di- or tri-guanyl-melamine or a mixture thereof, which is obtainable by treating dicyandiamide in an inert solvent at a raised temperature with a gaseous hydrogen halide and isolating the free amine from the resulting salt by the addition of a strong alkali. Substituted guanylmelamines may also be used for making the formaldehyde condensation products.

The salts of the formaldehyde condensation products which may be used instead of the free basic condensation products may be derived from inorganic acids such as hydrochloric or sulfuric acid, or from organic acid, more especially from lower aliphatic acids such as formic acid, acetic acid, propionic acid or glycolic acid.

According to the present process the fibrous materials can be impregnated successively with different aqueous preparations of which, for example, the one first used contains only the dyestuff and the second only the aminoplast. As a rule it is, however, advantageous to use preparations, that is to say impregnating liquors or printing pastes, that contain both the dyestuff and the aminoplast. It will be realized that such a preparation may contain more than one dyestuff and/or more than one aminoplast.

The impregnation can be performed in the conventional manner, advantageously at room temperature or a slightly higher temperature, for example at a temperature ranging from 10 to 40° C. The present process is especially suitable for continuous operation, for example for roller printing fabrics or for impregnating them on the padder.

The impregnating liquors may contain further additives, for example wetting or dispersing agents. The printing pastes may further contain the usual thickening agents such as starch, tragacanth, methylcellulose as well as further substances, for example hydrotropic agents such as urea.

The proportions in which the dyestuffs and aminoplasts—and, if desired, any assistants—are used in the present process may vary within wide limits. The amount of dyestuff depends substantially on the tinctorial strength desired. The amount of aminoplast used should in general not be inferior to that of the dyestuff; as a rule it is advantageous to use of the aminoplast a multiple of the amount of dyestuff used, or to use preparations that contain about 0.5 to 2% of aminoplast or printing pastes that contain up to about 10% of aminoplast respectively.

After application of the dyestuff and of the aminoplast to the fibrous material, it is subjected to a hardening process. It is of advantage to dry the material prior to hardening, with advantage at a temperature at which the material does not yet undergo substantial hardening, for example at a temperature below 100° C. Hardening is advantageously carried out by simply heating the material to the requisite temperature, for example within a range of 120 to 180° C. If desired, the hardening may be conducted in the presence of a hardening catalyst.

According to the type and amount of aminoplast used, the present process may in certain cases produce additional effects, such as making the fibers crease-resistant or hydrophobic.

To remove any unfixed dyestuff it is recommended to soap the dyeing after hardening in the usual manner, for example by treating it a 40 to 80° C. in a solution containing soap, or soap and sodium carbonate, or a synthtetic detergent, such as sodium 2-heptadecyl-N-benzyl benzimidazole disulfonate. The dyeings and prints produced by the present process are distinguished by their good fastness to wetting, and more esspecially by good fastness to washing.

Unless otherwise indicated, parts and percentages in the following examples—which illustrate the invention— are by weight.

EXAMPLE 1

A mercerized cotton fabric is treated on the padder with a solution containing in 1000 parts of water 10 parts of the sodium salt of the dyestuff of the formula:

(1)
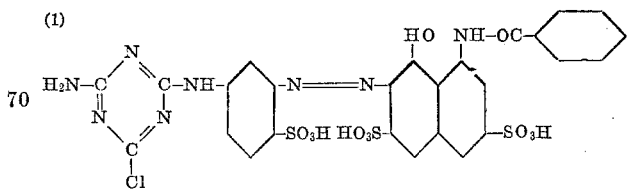

60 parts of a water-soluble methyl ether of a urea-formaldehyde condensation product obtained by condensing more than 2 molecular proportions of formaldehyde with 1 molecular proportion of urea, and 3 parts of ammonium chloride. Before being mixed with the ammonium chloride, the solution is adjusted to pH=7.5 to 8 by adding sodium hydroxide. The fabric is then squeezed to a weight increase of 70%, dried at 80° and then hardened for 5 minutes at 150° C., rinsed in cold water, soaped for 15 minutes at 86 to 100° C. in a solution containing per liter of water 5 grams of soap and 2 grams of anhydrous sodium carbonate to remove any unfixed dyestuff, rinsed successively in hot and cold water, and again dried. The fabric is dyed a bluish red tint, and the dyeing is very fast to washing.

In the same manner cotton fabric can be dyed with the dyestuffs of the following formulae:

(2)
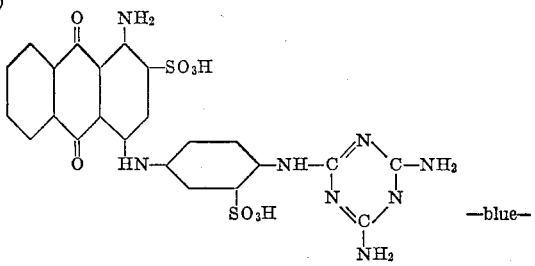
—blue—

(3)
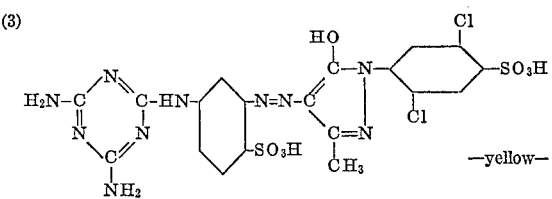
—yellow—

(4)
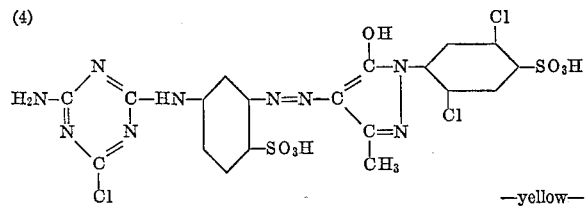
—yellow—

(5)
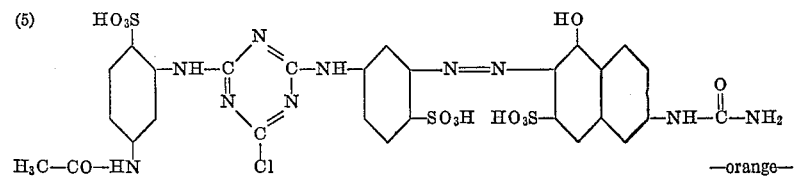
—orange—

(6)
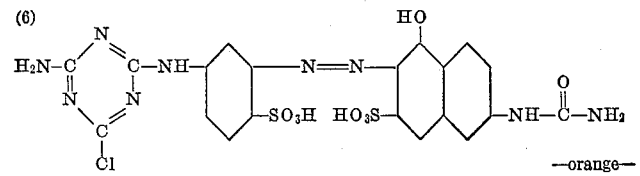
—orange—

(7)
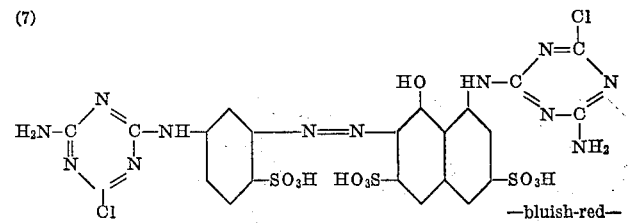
—bluish-red—

(8)
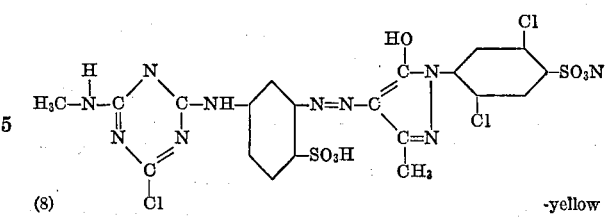
—yellow—

Instead of 60 parts of the urea derivative only 40 or 20 parts thereof may be added to the impregnation liquor, but the resulting dyeings are weaker and not quite so fast to washing. When, on the other hand, more than 60 parts of urea in 1000 parts of water are used, no substantial intensification of the tint or improvement in the fastness to washing is achieved.

EXAMPLE 2

Using any one of the dyestuffs mentioned in Example 1 and dyeing by the process therein described, with the exception that the urea derivative is replaced by a mixture of methylol-melamine methyl ethers, in which the majority of the methylol groups are etherified and the molecule contains an average of three to four methylol groups, a dyeing is obtained which is likewise fast to washing.

EXAMPLE 3

An aqueous printing paste is prepared which contains in 1000 parts 15 to 20 parts of carob bean flour, or an equivalent amount of another neutral thickening agent such as methylcellulose, tragacanth or sodium alginate, 10 parts of any one of the dyestuffs mentioned in Example 1, for example the dyestuff of Formula 1

50 to 100 parts of a mixture of methylol-melamine methyl ethers in which the majority of the methylol groups are etherified and the molecule contains on an average three to four methylol groups, 3 to 5 parts of ammonium sulfate or another acid donor, preferably an ammonium salt.

A cotton fabric of good absorbent power is printed with this paste in known manner, for example by screen or roller printing, dried and then heated for 5 minutes at at 150° C. The print treated in this manner is distinguished by very good fastness to boiling.

When between the drying and heating treatments the fabric is embossed, riffled or glazed on a calender with heated steel cylinder, local surface effects can be produced which coincide with the printed pattern.

EXAMPLE 4

By the procedure described in the 1st paragraph of Example 1, using one of the dyestuffs mentioned therein, for example the dyestuff or Formula 1, and dyeing instead of a cotton fabric one made from (a) polyamidic fibers from hexamethylenediamine and adipic acid (nylon),
(b) polyamidic fibers from ε-caprolactam,
(c) polyacrylonitrile fibers or
(d) cellulose acetate fibers, for example cellulose diacetate or cellulose triacetate, dyeings are obtained which are likewise fast to washing.

EXAMPLE 5

A mercerized cotton fabric is padded with a first solution containing in 1000 parts of water 10 parts of one of the dyestuffs mentioned in Example 1, subjected to intermediate drying, and then padded with another solution containing in 1000 parts of water 65 parts of a water-soluble methyl ether of a ureaformaldehyde condensation product obtained by condensing more than 2 molecular proportions of formaldehyde with 1 molecular proportion of urea, and 3 parts of ammonium chloride. After each padding operation the fabric is squeezed to a weight increase of 70%. The fabric treated in this manner is then dried, hardened and finished as described in Example 1. This procedure likewise yields dyeings of good fastness to washing.

EXAMPLE 6

A mercerized cotton fabric is treated on the padder with a solution containing in 1000 parts of water 10 parts of any one of the dyestuffs mentioned in Example 1, as well as 3 parts of ammonium chloride and 65 parts of any one of the following aminoplasts:

(a) a restrictedly water-soluble condensation product from 1 molecular proportion of melamine and 3 molecular proportions of formaldehyde;
(b) dimethylol urea;
(c) compound of the formula:

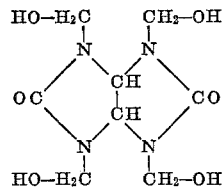

(d) compound of the formula:

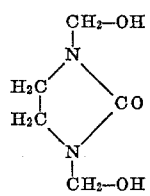

(e) compound of the formula:

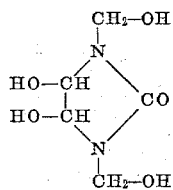

EXAMPLE 7

By the procedure described in Example 1 a yellow dyeing is obtained with the dyestuff containing N-methylol groups and prepared in the following manner:

33.6 parts of the primary condensation product from 1 molecular proportion of cyanuric chloride and 1 molecular proportion of 1:3-diaminobenzene-4-sulfonic acid are suspended in 3000 parts of water and 20 parts of hydrochloric acid of 30% strength and then diazotized with 25 parts by volume of 4 N-sodium nitrite solution at about 10° C. The resulting diazo suspension, which is acid to Congo red, is mixed with 30 parts of sodium acetate (CH$_3$CO$_2$Na·3H$_2$O) and then at 10° C. gradually with a solution of 21.5 parts of 1-phenyl-3-methyl-5-pyrazolone-4'-sulfonic acid in 104 parts by volume of N-sodium hydroxide solution. On completion of the coupling the precipitated dyestuff is filtered off, washed on the filter with dilute sodium chloride solution and dried in vacuo at about 50° C. When this dyestuff is reacted with ammonia, it yields the dyestuff of the formula:

(9)
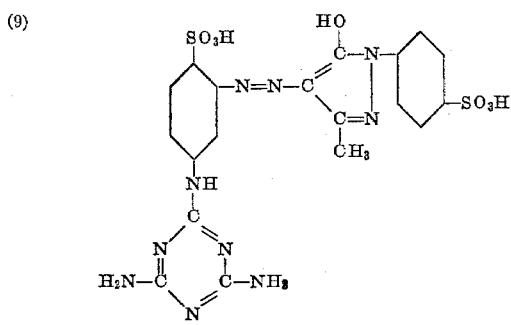

which is treated with sufficiency of formaldehyde solution of a strength of 20% by volume to ensure that 2.5 molecular proportions of formaldehyde for every amino group contained in the dyestuff molecule participate in the reaction. The reaction mixture is adjusted to a pH value of 9, and the resulting suspension refluxed on the water bath for 20 minutes, which produces rapid dissolution. On cooling the reaction mixture a pasty dyestuff precipitate is formed which is filtered off and dried in vacuo at about 50° C.

EXAMPLE 8

A mercerized, bleached cotton piece is padded with an aqueous liquor which contains in 1000 parts by volume 30 parts of the dyestuff corresponding to the formula:

(10)
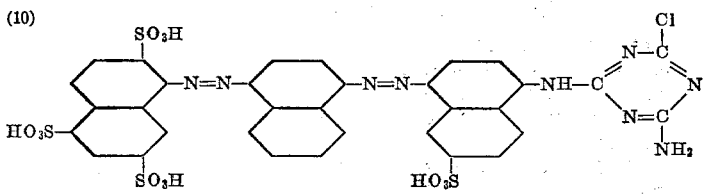

135 parts of aqueous solution of 75% strength of a fully methylated hexomethylol melamine, 20 parts of an aqueous emulsion of polyethylene of 20% strength and 4 parts of ammonium chloride. The fabric is then squeezed to a weight increase of 60 to 70%, dried at room temperature and then hardened for 6 minutes at 150° C., washed in a bath containing in 1000 parts of water 2 parts of an adduct of 9 mols of ethylene oxide and 1 mol of para-nonylphenol and 2 parts of anhydrous sodium carbonate, rinsed and dried. The fabric is dyed reddish brown and the dyeing is fast to washing at boiling temperature. Dyeings of similar shades and having also a good fastness to washing are obtained, when the dyestuff of Formula 10 is replaced by the following dyestuffs.

(11)
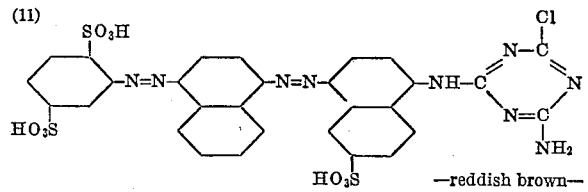
—reddish brown—

(12)
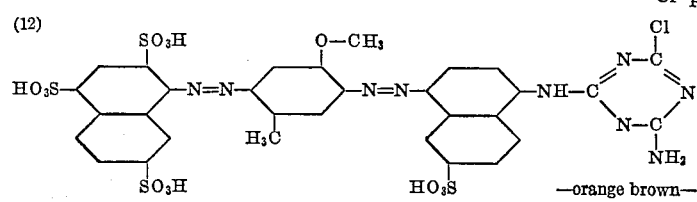
—orange brown—

(13)
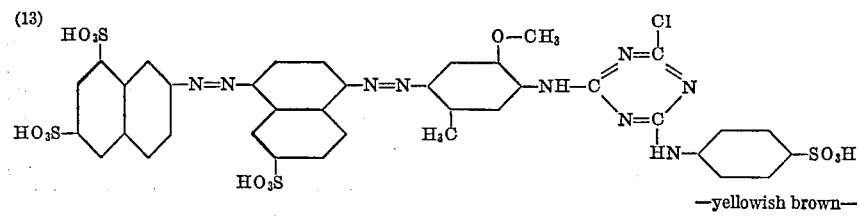
—yellowish brown—

(14)
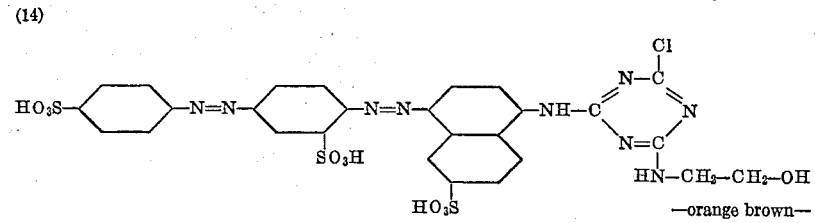
—orange brown—

(15)
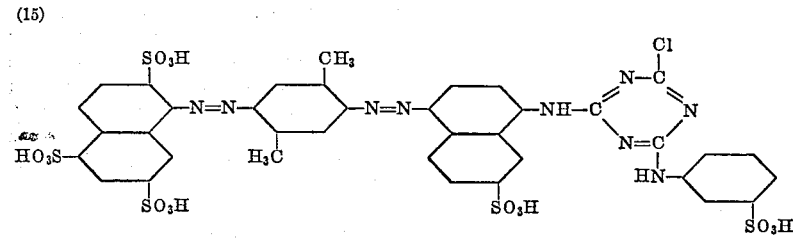
—orange brown—

(16)
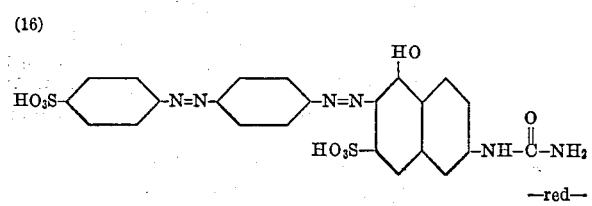
—red—

(17)
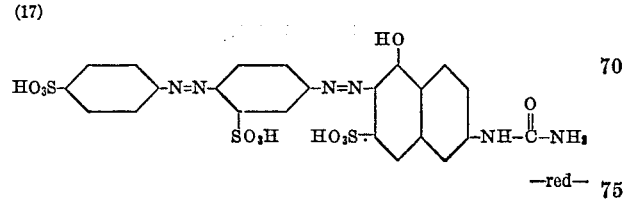
—red—

Instead of the solution of the methylated methylol melamine another aminoplast precondensate may be used, for instance dimethylolfiyloxal-monoureine or tetra-methylolacetylene-di-urea, with similar results.

EXAMPLE 9

The procedure as described in any one of the Examples 1 to 6 is followed with (a) the turquoise-blue dyestuff obtained by tetrasulfonation of copper phthalocyamine, partial conversion of the sulfonic acid groups into sulfonic acid chloride groups and exchange of the chlorine atoms of these groups for amino groups, or (b) copper-phthalocyamine trisulonic acid, which contains an

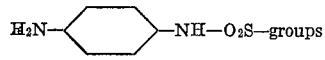

in addition to the three sulfonic acid groups and dyes greenish blue turquoise tints. The so-obtained dyeings or prints have a very good fastness to washing.

What is claimed is:

1. A process for the simultaneous finishing and coloring of a cellulose textile material which consists essentially in applying to said textile material an aqueous solution containing as essential ingredients:
   (1) a resin-forming substance selected from the class of methylol compounds consisting of the formaldehyde condensates of primary and secondary amine compounds and the lower alkyl ethers of said formaldehyde condensates;
   (2) a water-soluble dyestuff being substituted by an s-triazinyl radical bearing, attached to a carbon atom of said s-triazinyl radical, a member selected from the group consisting of —Cl and —NH₂; and
   (3) an acid catalyst; and thereafter heating same at a temperature of about 120° to 180° to effect reaction between said dyestuff and said resin and between said dyestuff and said fiber.

2. A process for coloring cellulose fibers which comprises impregnating the cellulose fibers in an aqueous medium with a mixture of (a) a water-soluble dyestuff selected from the group consisting of azo and anthroquinone dyestuffs, said dyestuff being substituted by a melamine radical bearing, attached to a nitrogen of said melamine radical, a member selected from the group consisting of (1) a reactive hydrogen which is capable of being substituted by a methylol group by reaction with formaldehyde, and (2) a methylol group, (b) an aminoplast-forming compound containing a methylol group in the molecule, and (c) a hydrogen ion donating agent; drying the impregnated fibers and then heating same at a temperature of about 120°–180° C. to form an aminoplast together with said dyestuff on the fibers.

3. A cellulose fiber when dyed according to the process according to claim 2.

4. Process for coloring cellulosic textile materials which comprises impregnating the textile materials in an aqueous medium with a water-soluble dyestuff containing at least one substituent selected from the group consisting of an amino group bound to a carbon atom of a triazine ring, an $H_2N—OC—NH$-group, an alkylolamino group bound to a triazine ring and an alkylolated $H_2N—CO—NH$-group and with a resin-forming substance selected from the class of methylol compounds consisting of the formaldehyde condensates of primary and secondary amine compounds and the lower alkyl ethers of said formaldehyde condensates, and heating the impregnated textile material at a temperature range of 120 to 180° C. to form an aminoplast.

5. Process for coloring cellulosic textile materials which comprises impregnating the textile materials in an aqueous medium with a water-soluble dyestuff containing at least one $H_2N$-group bound to a carbon atom of a triazine ring and with a resin-forming substance selected from the class of methylol compounds consisting of the formaldehyde condensates of primary and secondary amine compounds and the lower alkyl ethers of said formaldehyde condensates, and heating the impregnated textile material at a temperature of 120 to 180° C. to form an aminoplast.

6. Process for coloring cellulosic textile materials which comprises impregnating the textile material in an aqueous medium with a water-soluble dyestuff containing at least one $H_2N$-group bound to a carbon atom of a triazine ring and with a water-soluble colorless urea-formaldehyde resin, and heating the impregnated textile material at a temperature range of 120 to 180° C. to harden the resin.

7. Process for coloring cellulosic textile materials which comprises impregnating the textile materials in an aqueous medium with a water-soluble dyestuff containing at least one $H_2N$-group bound to a carbon atom of a triazine ring and with a water-soluble melamine formaldehyde resin, and heating the impregnated textile material at a temperature range of 120 to 180° C. to harden the resin.

8. Process for coloring cellulosic textile materials which comprises impregnating the textile materials in an aqueous medium with a water-soluble dyestuff containing at least one $H_2N$-group bound to a carbon atom of a triazine ring and with a water-soluble methyl ether of an urea-formaldehyde condensation product obtained by condensing 2 to 4 molecular proportions of formaldehyde with 1 molecular proportion of urea, and heating the impregnated material at a temperature range of 120 to 180° C. to harden the resin.

9. Process for coloring cellulosic textile materials which comprises impregnating the textile materials in an aqueous medium with a water-soluble dyestuff containing at least one $H_2N$-group bound to a carbon atom of a triazine ring and with a water-soluble methyl ether of a melamine formaldehyde condensation product obtained by condensing 3 to 6 molecular proportions of formaldehyde with 1 molecular proportion of melamine, and heating the impregnated material at a temperature range of 120 to 180° C. to harden the resin.

10. Process for coloring cellulosic textile materials which comprises impregnating the textile materials in an aqueous bath which contains a water-soluble dyestuff containing at least one $H_2N$-group bound to a carbon atom of a triazine ring and also contains a water-soluble melamine formaldehyde resin, drying the impregnated fibrous material at a temperature below 100° C., and heating the dried fibrous material at a temperature within the range of 120 to 180° C. to harden the aminoplast.

11. Process for coloring cellulosic textile materials which comprises impregnating the textile material in an aqueous bath which contains a water-soluble dyestuff of the formula:

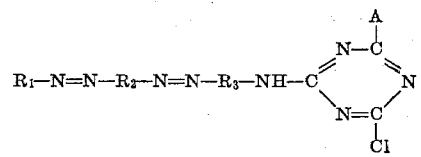

in which $R_1$, $R_2$ and $R_3$ each represent an aromatic radical containing at the most 10 ring carbon atoms and containing only aromatic rings and A represents an amino group, and also contains a water-soluble melamine formaldehyde resin, and heating the impregnated material at a temperature range of 120 to 180° C. to harden the resin.

12. Process for coloring cellulosic textile materials which comprises impregnating the textile materials in an aqueous medium with a copper phthalocyanine which contains at least 2 sulfonic acid groups and at least one substituent selected from the group consisting of N-alkylol group and a group convertible into an N-alkylol group, and with a resin-forming substance selected from the class of methylol compounds consisting of the formaldehyde condensates of primary and secondary amine compounds and the lower alkyl ethers of said formaldehyde condensates, and heating the impregnated fibrous material at a temperature range of 120 to 180° C. to form an aminoplast.

13. Process for coloring cellulosic textile material which comprises impregnating the textile materials in an aqueous bath which contains a copper phthalocyanine containing at least 2 sulfonic acid groups and at least 1 sulfonic acid amide group, and also contains a water-soluble melamine formaldehyde resin, and heating the impregnated material at a temperature range of 120 to 180° C. to harden the aminoplast.

References Cited

UNITED STATES PATENTS

| 2,093,651 | 9/1937 | Widmer | 8—54.2 |
| 2,197,357 | 4/1940 | Widmer | 8—18 |
| 2,773,871 | 12/1956 | Brassel | 8—54 X |
| 3,411,860 | 11/1968 | Braun et al. | 8—18 |

GEORGE F. LESMES, Primary Examiner

T. H. HERBERT, Jr., Assistant Examiner

U.S. Cl. X.R.

8—54.2, 162